United States Patent [19]
Mobley et al.

[11] Patent Number: 6,143,858
[45] Date of Patent: Nov. 7, 2000

[54] POLYESTERCARBONATE COMPRISING RESIDUES OF BRANCHED DIACIDS

[75] Inventors: David Paul Mobley, Niakayuna; Mohan Amaratunga, Clifton Park; Gary Charles Davis, Albany; Peter David Phelps, Schenectady, all of N.Y.

[73] Assignee: General Electric Company, Schenectady, N.Y.

[21] Appl. No.: 09/363,222

[22] Filed: Jul. 30, 1999

[51] Int. Cl.[7] .................................................... C08G 63/02
[52] U.S. Cl. ............................................ 528/196; 528/198
[58] Field of Search ...................................... 528/196, 198

[56] References Cited

U.S. PATENT DOCUMENTS

| | | | |
|---|---|---|---|
| 4,983,706 | 1/1991 | Fontana et al. | 528/176 |
| 5,025,081 | 6/1991 | Fontana et al. | 528/176 |
| 5,510,448 | 4/1996 | Fontana et al. | 528/196 |

*Primary Examiner*—Terressa M. Boykin
*Attorney, Agent, or Firm*—Robert T. Barker; Noreen C. Johnson

[57] ABSTRACT

This invention relates to polyestercarbonates comprising residues of at least one branched aliphatic dicarboxylic acid, and methods for preparation of polyestercarbonates comprising residues of at least one branched aliphatic dicarboxylic acid. This invention further relates to articles and methods of making articles from the polyestercarbonates.

20 Claims, No Drawings

POLYESTERCARBONATE COMPRISING RESIDUES OF BRANCHED DIACIDS

FIELD OF THE INVENTION

This invention relates to polyestercarbonates comprising residues of at least one branched aliphatic dicarboxylic acid, and methods for preparation of polyestercarbonates comprising residues of at least one branched aliphatic dicarboxylic acid. This invention further relates to articles and methods of making articles from the polyestercarbonates.

BACKGROUND OF THE INVENTION

Polycarbonates are well known as tough, clear, highly impact resistant thermoplastic resins. Polycarbonates, however, possess relatively high melt viscosity. The polycarbonate of 4,4'-isopropylidenediphenol (bishpenol A polycarbonate), for instance, is a well know engineering molding plastic.

In order to prepare a molded article from polycarbonate, relatively high extrusion and molding temperatures are required. In order to reduce the melt viscosity while also maintaining the desired physical properties, methods including the addition of plasticizers, the incorporation of aliphatic chainstoppers, the reduction of molecular weight, and the preparation of blends of polycarbonate with other polymers have been practiced.

U.S. Pat. No. 5,510,448 discloses a copolyestercarbonate composition derived from a dihydric phenol, a carbonate precursor, and an aliphatic alpha omega dicarboxylic acid or ester precursor.

U.S. Pat. No. 5,025,081 discloses a process of preparing a coplyestercarbonate in which an aliphatic alpha omega diacid is incorporated into aromatic polycarbonate backbones. The process involved a method in which the pH is adjusted in a stepwise manner.

U.S. Pat. No. 4,983,706 discloses a process for preparing a polyestercarbonate which comprises reacting interfacially a dihydric phenol, a carbonate precursor, and the salt of an aliphatic alpha omega dicarboxylic acid having from 8 to about 20 carbon atoms.

Known methods for incorporating diacid residues into polycarbonate involve the incorporation of at least one alpha, omega diacid residue.

SUMMARY OF THE INVENTION

The present invention concerns a polyestercarbonate and method of preparing the polyestercarbonate. In one embodiment of the invention, the invention concerns a polyestercarbonate comprising
a) carbonate structural units corresponding to:

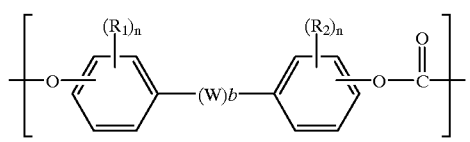

where
R$_1$ is independently selected from the group consisting of halogen, hydrogen, monovalent hydrocarbon, monovalent hydrocarbonoxy radicals,
R$_2$ is independently selected from the group consisting of halogen, hydrogen, monovalent hydrocarbon, and monovalent hydrocarbonoxy radicals;
W is selected from the group consisting of divalent hydrocarbon radicals,
—S—, —S—S—, —O—,

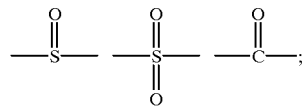

each n is independently selected from integers having a value of from 0 to 4 inclusive; and
b is zero or one;
the polyestercarbonate further comprising
b) residues of a branched dicarboxylic acid of structure V or its derivatives, the branched dicarboxylic acid having two carboxylic acid groups and a side aliphatic chain

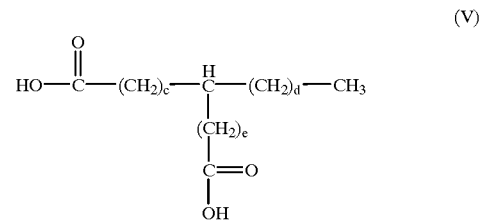

where
the dicarboxylic acid has from about 10 to about 40 carbon atoms;
c is an integer from 0 to about 36;
d is an integer from 0 to about 36; and
e is an integer from 0 to about 36
where the sum of c, d, and e is at least 6.

The invention further relates to a method of preparing polyestercarbonates comprising reacting interfacially a dihydric phenol, a carbonate precursor, and a branched aliphatic dicarboxylic acid having from 10 to about 40 carbon atoms, where the branched aliphatic dicarboxylic acid is present at about 0.5 to about 50 mole % based on the dihydric phenol reactant content and wherein the initial pH is from about 8 to about 9 for about 40 to about 95% of the carbonate precursor addition time period and is then raised to a final pH of from about 10 to about 12 for the remainder of the carbonate precursor time period.

The invention further relates to articles prepared from the polyestercarbonate and methods for making these articles.

DETAILED DESCRIPTION OF THE INVENTION

The present invention may be understood more readily by reference to the following detailed description of preferred embodiments of the invention and the examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In the specification and claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

The term "polyestercarbonate" includes polyesters and copolyestercarbonates.

The term "alkyl" as used herein refers to a branched or unbranched, saturated or unsaturated hydrocarbon group of 2 to 24 carbon atoms, with preferred groups within this class containing 2 to 8 carbon atoms.

"BPA" is herein defined as bisphenol A or 2,2-bis(4-hydroxyphenyl)propane.

"SBI" is herein defined as 6,6'-dihydroxy-3,3,3',3'-tetramethylspirobiindane.

"CD-I" is herein defined as 6-hydroxy-1(4'-hydroxyphenyl)-1,3,3-trimethylindane.

"BPI" is herein defined as 1,1 bis-(4-hydroxyphenyl)-3,3,5-trimethylcyclohexane.

Unless otherwise stated, "mol %" in reference to the composition of a polyestercarbonate in this specification is based upon 100 mol % of residues of the total dihydric phenol (diol) units and dicarboxylic acid units of the polycarbonate.

In one embodiment, the invention relates to polyestercarbonates and a method of preparing polyestercarbonate, the polyestercarbonates comprising:

a) carbonate structural units corresponding to:

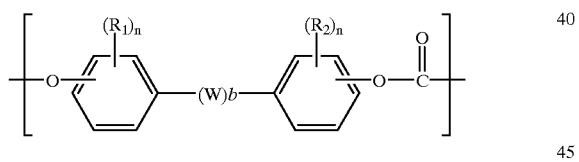

where
$R_1$ is independently selected from the group consisting of halogen, hydrogen, monovalent hydrocarbon, monovalent hydrocarbonoxy radicals,
$R_2$ is independently selected from the group consisting of halogen, hydrogen, monovalent hydrocarbon, and monovalent hydrocarbonoxy radicals;
W is selected from the group consisting of divalent hydrocarbon radicals,
—S—, —S—S—, —O—,

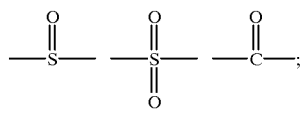

each n is independently selected from integers having a value of from 0 to 4 inclusive; and
b is zero or one;
the polyestercarbonate further comprising b) residues of a branched dicarboxylic acid of structure (V) or its derivatives, the branched dicarboxylic acid having two carboxylic acid groups and a side aliphatic chain

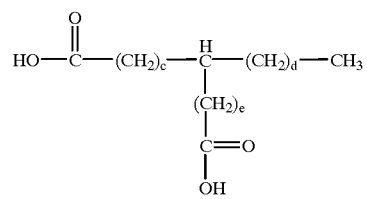

where
the dicarboxylic acid has from about 10 to about 40 carbon atoms;
c is an integer from 0 to about 36;
d is an integer from 0 to about 36; and
e is an integer from 0 to about 36
where the sum of c, d, and e is at least 6.

The polyestercarbonate may optionally further comprise c) structural units selected from the group consisting of:
1) carbonate structural units corresponding to:

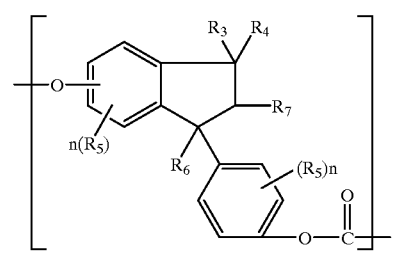

where $R_3$, $R_4$ and $R_6$ independently represent $C_1$–$C_6$ alkyl,
$R_5$ is H or $C_1$–$C_3$ alkyl and n is 0,1 or 2,
$R_7$ is H or $C_1$–$C_5$ alkyl, and
2) carbonate structural units corresponding to:

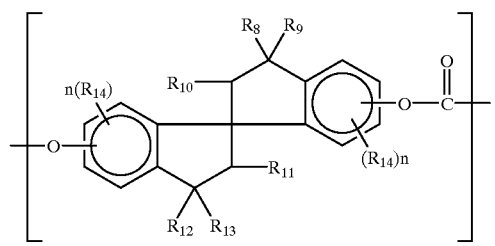

where $R_8$, $R_9$, $R_{12}$ and $R_{13}$ are independently $C_1$–$C_6$ alkyl,
$R_{10}$ and $R_{11}$ are independently H or $C_1$–$C_5$ alkyl,
each $R_{14}$ is independently selected from the group consisting of H and $C_1$–$C_3$ alkyl and each n is independently selected from the group consisting of 0,1 and 2;

3) carbonate structural units corresponding to

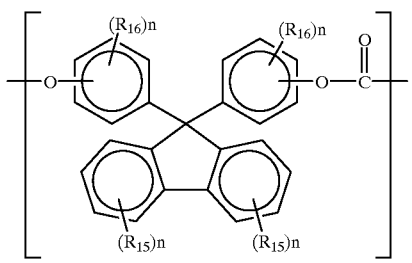
(IV)

4) carbonate structural units corresponding to structure (II) and (III);
5) carbonate structural units corresponding to structures (III) and (IV); and
6) carbonate structural units corresponding to structures (II) and (IV).

In an even further embodiment, the polyestercarbonate may comprise residues of branched diacid(s) (V) and structural units selected from structures (II), (III), (IV) and mixtures thereof. These polyestercarbonates are particularly suited for high temperature applications. "High temperature applications", as used herein, refers to those applications or uses requiring a glass transition temperature, $T_g$, greater than about 150° C. Component a) is not present in this embodiment.

Branched aliphatic diacids were found to provide an unexpected advantage over straight chain diacids. The branched diacids produce significantly more reduction in polymer melt viscosity than the straight chain diacid for a given amount of diacid as weight percent of the polyestercarbonate. Alternatively, the branched chain diacids yield the same reduction in polymer melt viscosity at a lower weight percent of diacid in the polyestercarbonate than the straight chain diacids.

For these polyestercarbonates, $T_g$ is an indicator of melt viscosity for polymers of similar molecular weight. That is, the same reduction in $T_g$ brought about by the addition of different diacids will result in polyestercarbonates with the same reduction in melt viscosity relative to the standard BPA polycarbonate of the same molecular weight. As an example of the effects of branched diacids as compared to straight chain diacids, dodecanedioc acid (DDDA), a straight chain diacid, reduces the $T_g$ of the polyestercarbonate at a rate of 2.3° C. per wt % of added DDDA (2.4° C. per mole % added DDDA) for polyestercarbonates with weight average molecular weights above about 55000. In contrast, the branched diacid, 9(10)-carboxystearic acid, reduces the $T_g$ of the polyestercarbonate at the rate of 3.2° C. per wt % added diacid (4.4° C. per mole % added diacid) for polyestercarbonates of similar molecular weight. Thus the branched diacid is significantly more effective than the straight chain diacid (DDDA) in reducing $T_g$, either on a weight percent or mole percent basis.

As mentioned, in one embodiment, the polyestercarbonate comprises components a), b) and optional component c). Component a) of the polyestercarbonate in this embodiment consists of residues of a dihydric phenol or phenols of the formula:

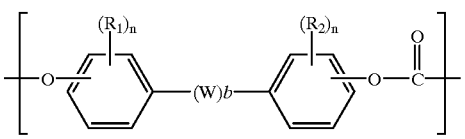
I where
$R_1$ is independently selected from the group consisting of halogen, hydrogen, monovalent hydrocarbon, monovalent hydrocarbonoxy radicals,
$R_2$ is independently selected from the group consisting of halogen, hydrogen, monovalent hydrocarbon, and monovalent hydrocarbonoxy radicals;
W is selected from the group consisting of divalent hydrocarbon radicals,
—S—, —S—S—, —O—,

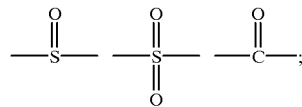

each n is independently selected from integers having a value of from 0 to 4 inclusive; and
b is zero or one.

The monovalent hydrocarbon radicals represented by $R_1$ and $R_2$ include the alkyl, cycloalkyl, aryl, aralkyl and alkaryl radicals. Preferably, the alkyl radicals contain from 1 to about 12 carbon atoms. Preferably the cycloalkyl radicals contain from 4 to about 8 carbons atoms. Preferred aryl radicals are those containing from 6 to 12 ring carbon atoms, including, but not limited to phenyl, naphthyl and biphenyl. The preferred alkaryl and aralkyl radicals are those containing from about 7 to about 14 carbon atoms.

Suitable halogen radicals represented by $R_1$ and $R_2$, include, but are not limited to, chlorine and bromine.

Suitable divalent hydrocarbon radicals represented by W include, but are not limited to, the alkylene, alkylidene, cycloalkylene and cycloalkylidene radicals. The preferred alkylene radicals contain from about 2 to about 30 carbon atoms; the preferred alkylidene radicals are those containing from 1 to about 30 carbon atoms; and the preferred cycloalkylene and cycloalkylidene radicals are those containing from about 5 to about 16 ring carbon atoms.

The monovalent hydrocarbonoxy radicals represented by $R_1$ and $R_2$ may be represented by the formula $-OR_{15}$ where $R_{15}$ is a monovalent hydrocarbon radical of the type described, including, but not limited to the alkyl, cycloalkyl, aryl, aralkyl and alkaryl radicals. Preferably, the alkyl radicals contain from 1 to about 12 carbon atoms. Preferably the cycloalkyl radicals contain from 4 to about 8 carbons atoms. Preferred aryl radicals are those containing from 6 to 12 ring carbon atoms, including, but not limited to phenyl, naphthyl and biphenyl. The preferred alkaryl and aralkyl radicals are those containing from about 7 to about 14 carbon atoms.

Suitable residues of the general formula I may be derived from diphenols including, but not limited to, BPA; 2,2-bis (3,5-dibromo-4-hydroxyphenyl)propane; 2,2-bis(3,5-dimethyl-4-hydroxyphenyl)propane; 1,1-bis(4- hydroxyphenyl)cyclohexane; 1,1-bis(3,5-dimethyl-4-hydroxyphenyl)cyclohexane; 1,1-bis(4-hydroxyphenyl)decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4-dihydroxyphenyl ether; 4,4-thiodiphenol; 4-4-dihydroxy-3,3-dichlorodiphenyl ether; 4,4-thiodiphenol; 4,4-dihydroxy-3,3-dichlorodiphenyl ether; 4,4-dihydroxy-2,5-dihydroxydiphenyl ether; BPI; 1,1-bis(4-hydroxyphenyl)-1-phenylethane; 1,1-bis(3-methyl-4-hydroxyphenyl)-1-phenylethane, and mixtures thereof. BPA is the more preferred diphenol. In one embodiment, the residues of structure I in the polyestercarbonate comprise 100 mol % of residues derived from BPA.

Component a) comprises from 50 to 99.5 mole % of the polyestercarbonate; preferably from 80 to 97.5 mole % of the polyestercarbonate.

The polyestercarbonates further comprise at least one residue of a branched aliphatic diacid or derivative thereof (component b), the branched aliphatic diacid represented by general structure (V):

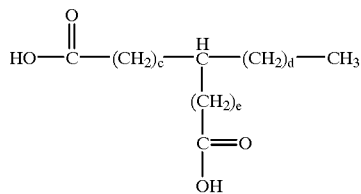

The branched dicarboxylic acid of structure (V) contains at least one non-terminal carboxylic acid group, resulting in an aliphatic side chain. The dicarboxylic acid of structure (V) comprises from about 10 to about 40 carbon atoms, preferably from about 12 to about 21 carbon atoms, more preferably from about 15 to about 19 carbon atoms.

In structure (V), c is an integer from about 0 to about 36, preferably about 2 to about 15, even more preferably from about 6 to about 11; d is an integer from about 0 to about 36, preferably from about 1 to about 14, more preferably from about 5 to about 10; e is an integer from about 0 to about 36, preferably 0 to about 10, more preferably 0.

The polyestercarbonate may comprise residues of one or more diacids represented by structure (V). Suitable diacids which may be incorporated into the polyestercarbonate, represented by structure (V), include, but are not limited to, 2-undecyloctanedioic acid; 2-decylnonanedioic acid; 2-nonyldecanedioic acid; 2-ocytiundecanedioic acid; 2-heptyldodecanedioic acid; 2-hexyltridecanedioic acid; 2-octylnonanedioic acid; 2-heptyldecanedioic acid; 2-hexylundecanedioic acid; 2-pentyldodecanedioic acid; 2-pentyldecanedioic acid; 2-butylundecanedioic acid; and mixtures thereof.

In a further embodiment, the branched diacids of the polyestercarbonate, represented by general formula (V), are selected from the group consisting of:

1) a dicarboxylic acids of structure (VI)

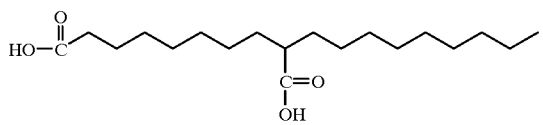

2) a dicarboxylic acids of structure (VII); and

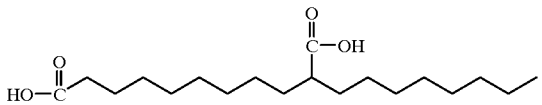

3) dicarboxylic acids of structures (VI) and (VII).

Structures (VI) and (VII), also represented by general formula (V), represent 9(10)-carboxystearic acid, a mixture of two isomers which may be prepared from oleic acid by catalytic reaction with carbon monoxide and water. The polyestercarbonate may further comprise residues of other branched diacids of general structure (V), in addition to residues of branched diacids of structures (VI), (VI) and mixtures thereof. The molar ratio of structures (VI) to structure (VII) in the polyestercarbonate is from 99:1 to 1:99. In one embodiment of the invention, the polyestercarbonate consists of residues of BPA, and branched dicarboxylic acid residues of structures (VI) and (VII).

The polyestercarbonates comprise from about 0.5 to about 50 mol % of residues of the branched dicarboxylic acid; preferably from about 0.5 to about 20 mole % of residues of the branched dicarboxylic acid; even more preferably from about 0.5 to about 10 mole % of residues of branched dicarboxylic acid. In one embodiment of the invention, the residues of the branched dicarboxylic acid comprise from 2.5 to 10 mole % of the polyestercarbonate.

Optionally, the polyestercarbonate comprising structural units corresponding to structure (I) and residues of branched diacids (V), including structures (VI), (VII), and mixtures thereof, may comprise residues of other monomers. In one embodiment of the invention, the polyestercarbonates comprising structural units corresponding to structure (I) and residues of branched diacids (V) further comprise component c), structural units selected from the group consisting of:

1) carbonate structural units corresponding to:

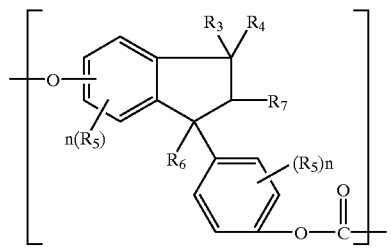

where $R_3$, $R_4$ and $R_6$ independently represent $C_1$–$C_6$ alkyl, $R_5$ is H or $C_1$–$C_3$ alkyl and n is 0,1 or 2,
$R_7$ is H or $C_1$–$C_5$ alkyl, and
2) carbonate structural units corresponding to:

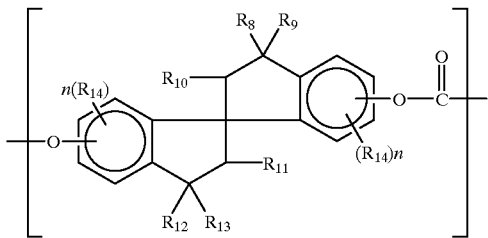

(III)

where $R_8$, $R_9$, $R_{12}$ and $R_{13}$ are independently $C_1$–$C_6$ alkyl,
$R_{10}$ and $R_{11}$ are independently H or $C_1$–$C_5$ alkyl,
each $R_{14}$ is independently selected from the group consisting of H and $C_1$–$C_3$ alkyl and each n is independently selected from the group consisting of 0,1 and 2;

3)

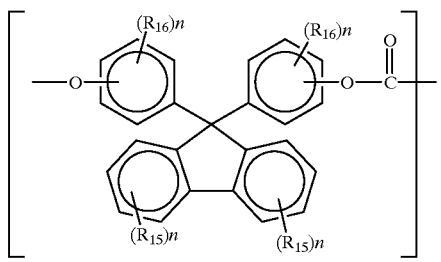

(IV)

where each $R_{15}$ is independently H or $C_1$–$C_5$ alkyl; and each n is 0,1 or 2
and each $R_{16}$ is independently H or $C_1$–$C_5$ alkyl or halogen selected from the group consisting of chlorine, fluorine or bromine; and each n is 0,1 or 2;
4) carbonate structural units corresponding to structure (II) and (III);
5) carbonate structural units corresponding to structures (II) and (IV); and
6) carbonate structural units corresponding to structures (III) and (IV).

As mentioned, in an even further embodiment, the polyestercarbonate may comprise residues of branched diacid(s) (V) and structural units selected from structures (II), (III), (IV) and mixtures thereof. Component a) is not present in this embodiment. In an even further embodiment, the residues of the branched diacids are selected from the group consisting of structure (VI), (VI) and mixtures thereof, and optionally residues of other branched diacids of structure (V); the polyestercarbonate further comprising carbonate structural units corresponding to structures (II), (III), (IV) or mixtures thereof. Component a) is not present in the polyestercarbonates of this embodiment. The polyestercarbonates of these embodiments are particularly suitable for high temperature applications, i.e. those applications requiring a polymer with a glass transition temperature, $T_g$, greater than about 150° C. Headlamp lenses are an example of such an application.

Representative units of structure (II) suitable for use in the polyestercarbonates of this invention, include, but are not limited to residues of 6-hydroxy-1-(4'-hydroxyphenyl)-1,3,3-trimethylindane (CD-I); 6-hydroxy-1-(4'-hydroxy-3'-methylphenyl)-1,3,3,5-tetramethylindane. Residues of CD-I are more preferred.

Representative units of structure (III) suitable for use in the polyestercarbonates of this invention include, but are not limited to residues of 6,6'-dihydroxy-3,3,3',3'-tetramethyl spirobiindane(SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy 3,3,3', 3'-tetramethylspirobiindane and mixtures thereof. Residues of SBI and its ortho alkylated homologs are more preferred.

Representative units of structure (IV) suitable for use in the polyestercarbonates of this invention, include 9,9-bis(4-hydroxyphenyl)flourene (this is the parent bisphenol) 9,9-bis(3-methyl-4-hydroxyphenyl)flourene; 9,9-bis(3-ethyl-4-hydroxyphenyl)flourene; 9,9-bis(3-n-propyl-4-hydroxyphenyl)flourene; 9,9-bis(3-isopropyl-4-hydroxyphenyl)flourene; 9,9-bis(3,5-dimethyl-4-hydroxyphenyl)flourene; 9,9-bis(3,5-dibromo-4-hydroxyphenyl)flourene and mixtures thereof.

In this embodiment, the sum of components a) and c) comprise from 50 to 99.5 mole % of the polyestercarbonate, preferably from 80 to 97.5 mole % of the polyestercarbonate. In the embodiment in which a) is not present, the carbonate units corresponding to structure (II), (II),(IV) or a mixture thereof comprise from 50 to 99.5 mole % of the polyestercarbonate, preferably from 80 to 97.5 mole % of the polyestercarbonate.

The polyestercarbonates of the invention preferably have glass transition temperatures of at least about 115° C. Preferred glass transition temperatures are in the range of about 115° C. to about 180° C.; more preferably 125° C. to about 150° C.

The weight average molecular weight of the polyestercarbonate, as measured by GPC using a polystyrene standard, is from about 10,000 to about 70,000; preferably about 15,000 to about 65,000; even more preferably about 25,000 to about 55,000.

In addition to the components described, the polyestercarbonates may comprise residues of a chain terminating agent. Quantities of chain terminating agent vary from about 0.5 to about 7 mol %, based on the dihydric phenol. Suitable chain terminating agents include monofunctional hydroxyaromatic agents, such as phenols. Suitable phenols include, but are not limited to phenol, isoctylphenol; para-tertiary butyl phenol; isononyl phenol; paracumyl phenol; chromanyl compounds, such as chroman I, and mixtures thereof. The corresponding chloformates of these compounds may also be used.

The polyestercarbonate may be prepared by the interfacial method. In one embodiment of the invention, the method of preparing the polyestercarbonates comprises reacting interfacially the dihydric phenol, a carbonate precursor, such as phosgene, and a branched aliphatic dicarboxylic acid as represented by formula V, where the branched aliphatic dicarboxylic acid is present at about 0.5 to about 50, preferably about 0.5 to about 20 mole % based on the dihydric phenol reactant content and wherein the initial pH is from about 8 to about 9 for about 40 to about 95, preferably 50 to 85% of the carbonate precursor addition time period and is then raised to a final pH of from about 10 to about 12 for the remainder of the carbonate precursor addition time period.

Amine catalysts, including, but not limited to triethylamine, may be employed in the interfacial reation. The amine catalyst may be introduced within a range of about 0.75 to about 3.0 mol % based on the dihydric phenol content in the interfacial reaction. In addition, phase transfer catalysts may be used, such as tetralkylammonium salts, guanadinium salts and mixtures thereof; alone or in combination with amine catalysts.

The polyestercarbonate may be used to form a number of articles for a variety of uses. End-use applications include molded articles such as instrument panels for cars, food service containers; housings for telephones; housings for computer; optical articles such as eyeglasses, lenses, and face shields; and recording media such as compact disks.

The desired article may be obtained by molding the polycarbonate or polycarbonate blend by injection molding, compression molding, extrusion methods and solution casting methods. Injection molding is the more preferred method of forming the article.

If desired, the polyestercarbonates of the invention may be blended with other polymers. Suitable modifying polymers are those which form blends with the polycarbonates of the invention. Possible modifying polymers include polycarbonates, other polyestercarbonates; polyesters, polyamides, polystyrenes, polyurethanes, polyarylates, liquid crystalline polymers, vinyl polymers and the like, or mixtures thereof.

The polyestercarbonates of the present invention may also contain antioxidants, flame retardants, such as phosphorous or halogen compounds, fillers, such as talc or mica, or reinforcing agents such as glass fiber, KEVLAR, or carbon fiber. Additives, such as pigments, dyes, stabilizers, plasticizers may also be used in the polyestercarbonates and blends of the present invention to modify the properties of the product.

The following examples are intended to illustrate the present invention but are not intended to limit the scope thereof.

EXAMPLES

Example 1

A 500 ml 5-necked round-bottomed flask, charged with 35.31 g bisphenol A (BPA), 1.64 g p-cumyl phenol (PCP), 3.54 g 9(10)-carboxystearic acid (hereafter referred to as C19DA), 150 ml methylene chloride, 80 ml water, and 340 μl triethylamine, was fitted with a gas inlet tube, a mechanical stirrer, a caustic addition tube, a water-cooled condenser, and a pH electrode. The pH was controlled by addition of aqueous 50% sodium hydroxide solution. Phosgene was delivered to the flask at the rate of 0.6 g/min, while stirring and maintaining the pH at 8.0. When 11.8 g of phosgene was delivered, the phosgene delivery was stopped, and the pH was adjusted to 10.5 by increasing pH by 0.3 units/minute. After stirring for an additional 6 minutes, the phosgene delivery was resumed at the rate of 0.6 g/min. When the total delivered phosgene was 19.7 g, the reaction was stopped. The reaction mixture was purged with nitrogen. The organic phase was separated from the brine layer, washed two times with 1N hydrochloric acid, and washed four times with deionized water. A sample from the brine solution was acidified to pH 1 with concentrated HCl and no unreacted C19DA precipitated.

The polymer was isolated by dripping the methylene chloride solution into methanol in a blender. The resin was washed with water and dried at 70° C. overnight followed by drying 12 hours at 105° C.

Examples 2–9

The same process used in Example 1 was repeated, but the amounts of PCP and C19DA were varied from 0.82 g to 1.64 g and from 1.14 g to 3.54 g, respectively.

Measured Tg and molecular weights of the polymers of Examples 1–9 are given in Table 1.

TABLE 1

Examples of the invention with varying levels of C19DA and chain terminating agent (PCP).

| Example | C19DA, g | PCP, g | Mol % C19DA | Wt % C19DA | Tg, ° C. | Molecular weight |
|---|---|---|---|---|---|---|
| 1 | 1.14 | 1.64 | 2.19 | 3.13 | 133.5 | 38100 |
| 2 | 1.14 | 1.07 | 2.19 | 3.13 | 140.0 | 53000 |
| 3 | 1.14 | 0.82 | 2.19 | 3.13 | 142.6 | 66100 |
| 4 | 2.47 | 1.64 | 4.64 | 6.54 | 125.6 | 36500 |
| 5 | 2.47 | 1.07 | 4.64 | 6.54 | 128.7 | 52400 |
| 6 | 2.47 | 0.82 | 4.64 | 6.54 | 130.5 | 63200 |
| 7 | 3.54 | 1.64 | 6.51 | 9.11 | 116.0 | 35700 |
| 8 | 3.54 | 1.07 | 6.51 | 9.11 | 121.8 | 49400 |
| 9 | 3.54 | 0.82 | 6.51 | 9.11 | 123.5 | 65400 |

Standard polycarbonate prepared with BPA with a molecular weight above about 55000 has a Tg of 150° C. Comparing standard BPA polycarbonate with the above Examples in this molecular weight range, it is seen that the Tg is lowered by 3.2° C. per wt % added C19DA (or 4.4° C. per mole % added C19DA). For comparison, a polyestercarbonate prepared from BPA and 9.2 wt % (9.1 mol %) dodecanedioic acid (DDDA, a linear dicarboxylic acid) with 2.6 mol % PCP has a molecular weight above 55000 and a Tg of 128° C., for a Tg reduction of 2.3° C. per wt % added DDDA (2.4° C. per mole % added DDDA). Thus, the branched diacid (C19DA) is significantly more effective than DDDA in reducing Tg, either on a weight percent or mole percent basis.

Example 10

A 500 mL Morton flask was charged with C19DA (1.55 g, 4.7 mmol), BPA (17.16 g, 75.25 mmol), SBI (5.54 g, 18.0 mmol), p-cumylphenol (1.06 g, 5.0 mmol), methylene chloride (150 mL), distilled water (80 mL), MTBA (0.23 g of a 75wt % solution in water) and N-methylpiperdine (2.7 mg). The pH was adjusted to 8.0 with 50 wt % sodium hydroxide. Phosgene (6.8 g, 68 mmol, 70 mol % equivalence) was added at 0.25 g/min maintaining the pH at 8.0 by the addition of the sodium hydroxide solution. The pH was raised to 10.5 over a 3 minute period and phosgene was added at 0.25 g/min to an overall total of 11.6 g total (20 mole % excess). The polymer solution was separated from the brine and washed one time with 1N HCl and four times with distilled water. The polymer solution was precipitated into boiling water (750 mL) in a blender, washed with water (500 mL) and dried overnight at 100° C. under vacuum. The polymer, analyzed by 1-H nmr, showed no anhydride present. The Tg was 140° C. and the Mw was 34,400.

Examples 11–16

In the following table, examples 11, 13, and 15, with DDDA are comparative examples which were prepared by the interfacial method.

Examples 12,14 and 16 are prophetic examples, the procedure for making these polyestercarbonates are as follows, with SBI, CD-I or Bisphenolflourene. SBI is used in the following illustrative example:

Prophetic Example 12

A 500 mL Morton flask is charged with C19DA (6.46 g, 19.6 mmol), SBI (24.30 g, 78.4 mmol), p-cumylphenol (1.06 g, 5.0 mmol, 5.1 mol %), methylene chloride (150 mL), distilled water (80 mL), MTBA (0.23 g of a 75wt % solution in water) and N-methylpiperdine (2.7 mg). The pH is adjusted to 8.0 with 50 wt % NaOH. Phosgene (6.8 g, 68 mmol, 70 mol % equivalence) is added at 0.25 g/min maintaining the pH at 8.0 by the addition of the NaOH solution. The pH is raised to 10.5 over a 3 minute period and phosgene is added at 0.25 g/min to an overall total of 11.6 g total (20 mole % excess). The polymer solution is separated from the brine and washed one time with 1N HCl and four times with distilled water. The polymer solution is precipitated into boiling water (750 mL) in a blender, washed with water (500 mL) and dried overnight at 100° C. under vacuum. The polymer, analyzed by 1-H nmr, shows no anhydride present. The Tg is 140° C.

Similarly the polymers prepared at the same molar ratio of CD-I or Bisphenolflourene to diacid would be predicted to have the values summarized in the following Table 2.

TABLE 2

Comparison of polestercarbonates with either C19DA or DDDA and various bisphenols.

| Example | Bisphenol (mol %) | Diacid (mol %) | Tg (° C.) |
|---|---|---|---|
| 11 | SBI (80) | DDDA (20) | 170 |
| 12** | SBI (80) | C19DA (20) | 140 |
| 13 | CD-I (80) | DDDA (20) | 150 |
| 14** | CD-I (80) | C19DA (20) | 120 |
| 15 | Bisphenolflourene* (80) | DDDA (20) | 190 |
| 16** | Bisphenolflourene* (80) | C19DA (20) | 160 |

*9,9-bis(4-hydroxyphenyl)fluorene
**prophetic examples

What is claimed is:

1. A polyestercarbonate comprising
   a) carbonate structural units corresponding to structure I:

$$\left[ -O - \underset{(W)_b}{\underset{|}{\bigcirc}}(R_1)_n - \bigcirc(R_2)_n - O - \underset{O}{\overset{\parallel}{C}} - \right]$$ (I)

where
R$_1$ is independently selected from the group consisting of halogen, hydrogen, monovalent hydrocarbon, monovalent hydrocarbonoxy radicals,
R$_2$ is independently selected from the group consisting of halogen, hydrogen, monovalent hydrocarbon, and monovalent hydrocarbonoxy radicals;
W is selected from the group consisting of divalent hydrocarbon radicals,
—S—, —S—S—, —O—, $$-\overset{O}{\underset{\parallel}{S}}-, \quad -\overset{O}{\underset{\underset{\parallel}{O}}{\overset{\parallel}{S}}}-, \quad -\overset{O}{\underset{\parallel}{C}}-;$$

each n is independently selected from integers having a value of from 0 to 4 inclusive; and
b is zero or one;
the polyestercarbonate further comprising
   b) residues of a branched dicarboxylic acid of structure V or its derivatives, the branched dicarboxylic acid having two carboxylic acid groups and a side aliphatic chain $$HO-\overset{O}{\underset{\parallel}{C}}-(CH_2)_c-\underset{\underset{\underset{OH}{|}}{\underset{C=O}{|}}}{\overset{H}{\underset{|}{C}}}-(CH_2)_d-CH_3$$ (V)

where
the dicarboxylic acid has from about 10 to about 40 carbon atoms;
c is an integer from 0 to about 36;
d is an integer from 0 to about 36; and
e is an integer from 0 to about 36
where the sum of c, d, and e is at least 6.

2. The polyestercarbonate of claim 1, wherein component a) comprises from about 50 to 99.5 mol % of the copolyester carbonate.

3. The polyestercarbonate of claim 1, wherein component b) comprises from 0.5 to 50 mole % of the copolyester carbonate.

4. The polyestercarbonate of claim 1, wherein component b) comprises from about 2 to about 20 mole % of the polyester carbonate.

5. The polyestercarbonate of claim 1, wherein component a) comprises from 90 to 97.5% of the copolyester carbonate and component b) comprises from 2.5 to 10 mole % of the copolyester carbonate.

6. The polyestercarbonate of claim 1, having a glass transition temperature of at least about 115° C.

7. The polyestercarbonate of claim 1, having a weight average molecular weight of from 10,000 to 70,000.

8. The polyestercarbonate of claim 1, having a weight average molecular weight of from about 15,000 to 65,000.

9. The polyestercarbonate of claim 1, having a weight average molecular weight of from 25,000 to 55,000.

10. The polyestercarbonate of claim 1 further comprising c) structural units selected from the group consisting of:
    1) carbonate structural units corresponding to:

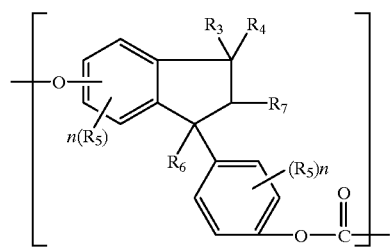

(II)

where $R_3$, $R_4$ and $R_6$ independently represent $C_1-C_6$ alkyl, $R_5$ is H or $C_1-C_3$ alkyl and n is 0,1 or 2, $R_7$ is H or $C_1-C_5$ alkyl, and 2) carbonate structural units corresponding to:

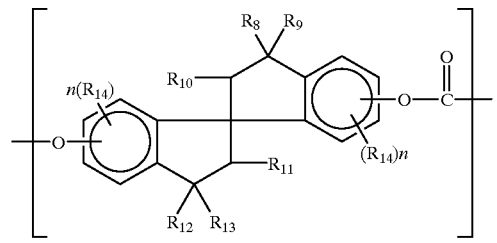

(III)

where $R_8$, $R_9$, $R_{12}$ and $R_{13}$ are independently $C_1-C_6$ alkyl, $R_{10}$ and $R_{11}$ are independently H or $C_1-C_5$ alkyl, each $R_{14}$ is independently selected from the group consisting of H and $C_1-C_3$ alkyl and each n is independently selected from the group consisting of 0, 1 and 2;

3) carbonate structural units corresponding to

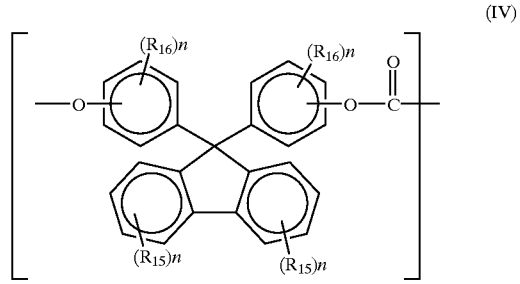

(IV)

4) carbonate structural units corresponding to structure (II) and (III);
5) carbonate structural units corresponding to structures (III) and (IV); and
6) carbonate structural units corresponding to structures (II) and (IV).

11. A polyestercarbonate comprising a) carbonate structural units corresponding to structure I:

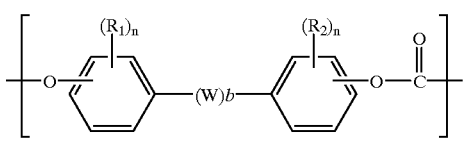

I where $R_1$ is independently selected from the group consisting of halogen, hydrogen, monovalent hydrocarbon, monovalent hydrocarbonoxy radicals, $R_2$ is independently selected from the group consisting of halogen, hydrogen, monovalent hydrocarbon, and monovalent hydrocarbonoxy radicals;

W is selected from the group consisting of divalent hydrocarbon radicals,

—S—, —S—S—, —O—,

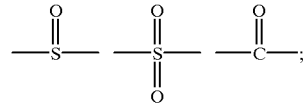

each n is independently selected from integers having a value of from 0 to 4 inclusive; and b is zero or one;

the polyestercarbonate further comprising b) residues of branched dicarboxylic acids selected from the group consisting of
    1) a dicarboxylic acids of structure (VI)

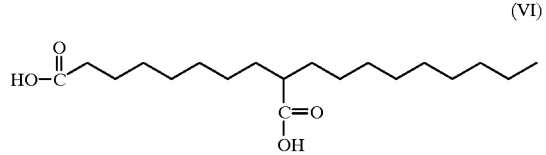

(VI)

2) a dicarboxylic acids of structure (VII); and

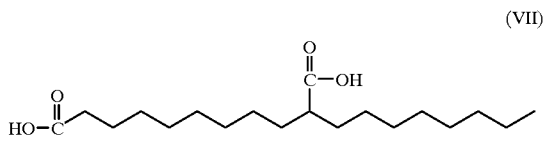
(VII)

3) dicarboxylic acids of structure (VI) and (VII).

12. A polyestercarbonate comprising a) residues of bisphenol A; and b) residues of branched dicarboxylic acids selected from the group consisting of 1) a dicarboxylic acids of structure (VI)

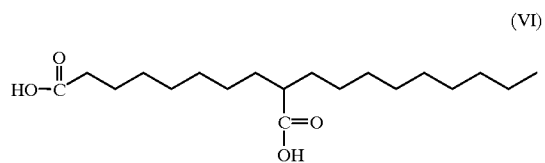
(VI)

2) a dicarboxylic acids of structure (VII); and

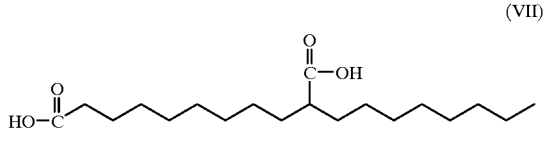
(VII)

3) dicarboxylic acids of structure (VII) and (VII).

13. The polyestercarbonate of claim 12, wherein the dicarboxylic acid is selected to be dicarboxylic acids of structures (VI) and (VII), and wherein the molar ratio of structure(VI) to(VII) is from 99:1 to 1:99.

14. An article prepared from the polyestercarbonate of claim 1.

15. An article prepared from the polyestercarbonate of claim 12.

16. An extruded article prepared from the polyestercarbonate of claim 1.

17. A method of preparing a polyestercarbonate comprising reacting interfacially a dihydric phenol, a carbonate precursor, and a branched aliphatic dicarboxylic acid having from 10 to about 40 carbon atoms, where the branched aliphatic dicarboxylic acid is present at about 0.5 to about 20 mole % based on the dihydric phenol reactant content and wherein the initial pH is from about 8 to about 9 for about 40 to about 95 of the carbonate precursor addition time period and is then raised to a final pH of from about 10 to about 12 for the remainder of the carbonate precursor time period.

18. The method of claim 17, wherein the branched aliphatic dicarboxylic acid is selected from the group consisting of 1) dicarboxylic acids of structure (VI)

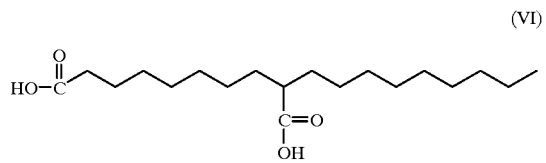
(VI)

2) dicarboxylic acids of structure (VII); and

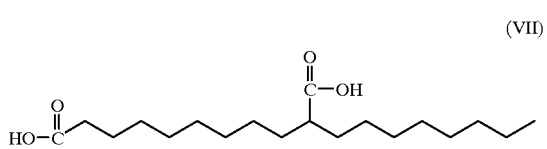
(VII)

3) dicarboxylic acids of structure (VI) and (VII).

19. A polyestercarbonate comprising:

(I) structural units selected from the group consisting of:

1) carbonate structural units corresponding to:

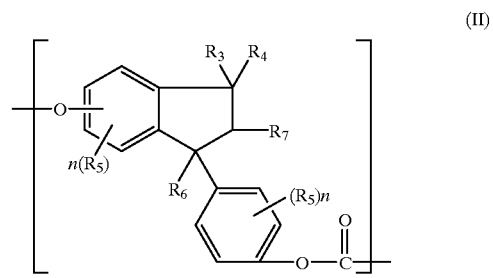
(II)

where $R_3$, $R_4$ and $R_6$ independently represent $C_1$–$C_6$ alkyl, $R_5$ is H or $C_1$–$C_3$ alkyl and n is 0,1 or 2, $R_7$ is H or $C_1$–$C_5$ alkyl, and 2) carbonate structural units corresponding to:

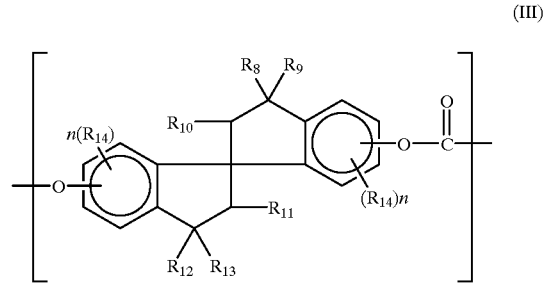
(III)

where $R_8$, $R_9$, $R_{12}$ and $R_{13}$ are independently $C_1$–$C_6$ alkyl, $R_{10}$ and $R_{11}$ are independently H or $C_1$–$C_5$ alkyl, each $R_{14}$ is independently selected from the group consisting of H and $C_1$–$C_3$ alkyl and each n is independently selected from the group consisting of 0, 1 and 2;

3) carbonate structural units corresponding to

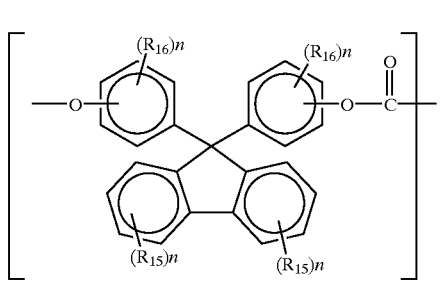
(IV)

4) carbonate structural units corresponding to structure (II) and (III);
5) carbonate structural units corresponding to structures (III) and (IV); and
6) carbonate structural units corresponding to structures (II) and (IV);

the polyestercarbonate further comprising:

(II) residues of branched dicarboxylic acids selected from the group consisting of:
  1) a dicarboxylic acids of structure (VI)

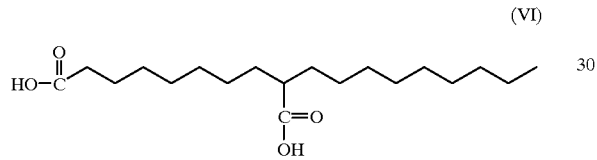
(VI)

2) dicarboxylic acids of structure (VII); and

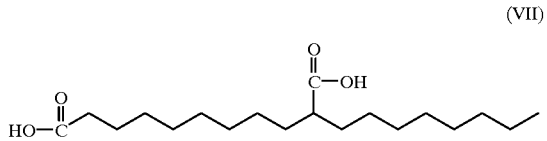
(VII)

3) dicarboxylic acids of structure (VI) and (VII).

20. A polyestercarbonate comprising:

(I) structural units selected from the group consisting of:
  1) carbonate structural units corresponding to:

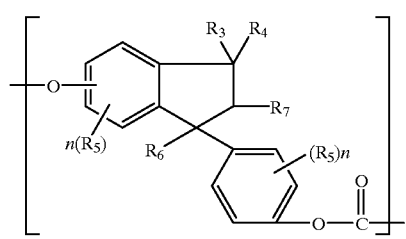
(II)

where $R_3$, $R_4$ and $R_6$ independently represent $C_1$–$C_6$ alkyl,
$R_5$ is H or $C_1$–$C_3$ alkyl and n is 0,1 or 2,
$R_7$ is H or $C_1$–$C_5$ alkyl, and 2) carbonate structural units corresponding to:

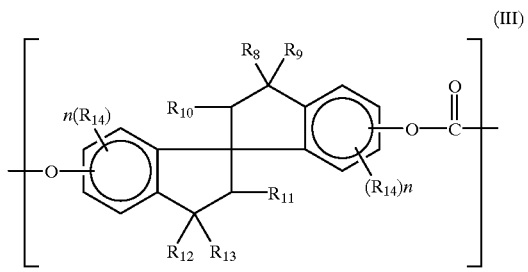
(III)

where $R_8$, $R_9$, $R_{12}$ and $R_{13}$ are independently $C_1$–$C_6$ alkyl,
$R_{10}$ and $R_{11}$ are independently H or $C_1$–$C_5$ alkyl,
each $R_{14}$ is independently selected from the group consisting of H and $C_1$–$C_3$ alkyl and each n is independently selected from the group consisting of 0, 1 and 2;

3) carbonate structural units corresponding to

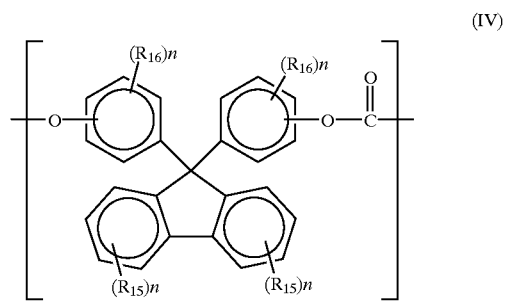
(IV)

4) carbonate structural units corresponding to structure (II) and (III);
5) carbonate structural units corresponding to structures (III) and (IV); and
6) carbonate structural units corresponding to structures (II) and (IV);

the polyestercarbonate further comprising:

(II) residues of a branched dicarboxylic acid of structure V or its derivatives, the branched dicarboxylic acid having two carboxylic acid groups and a side aliphatic chain

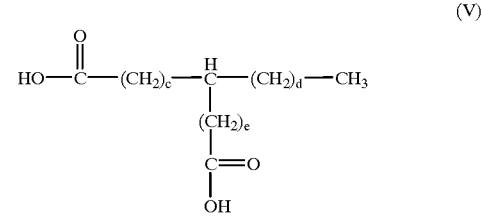
(V)

where
the dicarboxylic acid has from about 10 to about 40 carbon atoms;
c is an integer from 0 to about 36;
d is an integer from 0 to about 36; and
e is an integer from 0 to about 36
where the sum of c, d, and e is at least 6.

* * * * *